United States Patent Office 3,104,958
Patented Sept. 24, 1963

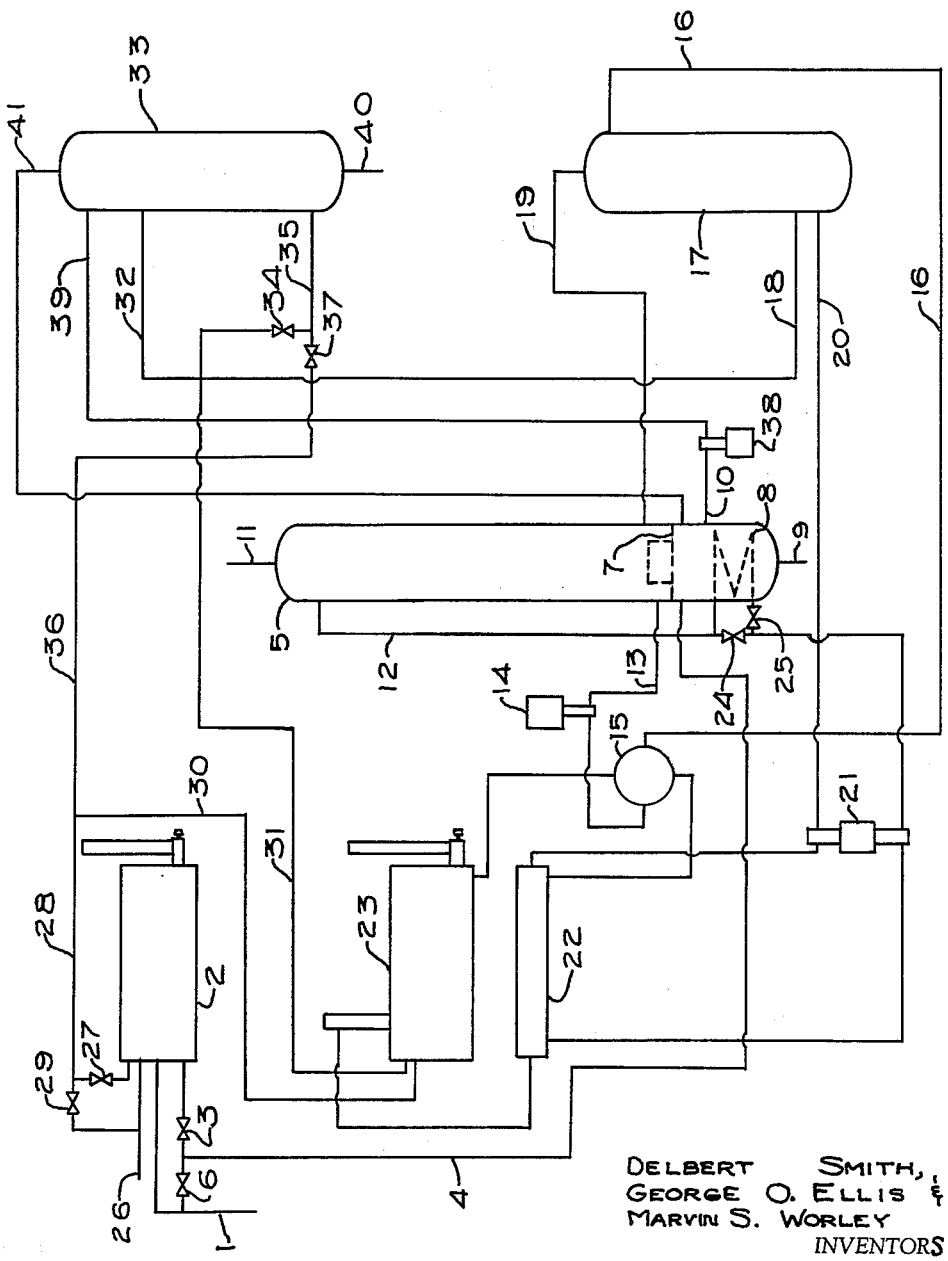

3,104,958
METHOD AND APPARATUS FOR DEHYDRATING AN ACIDIC GAS STREAM
Delbert P. Smith, Calgary, Alberta, Canada, and George O. Ellis and Marvin S. Worley, Oklahoma City, Okla., assignors to Black, Sivalls & Bryson, Inc., Kansas City, Mo., a corporation of Delaware
Filed June 23, 1960, Ser. No. 38,321
3 Claims. (Cl. 55—32)

The present invention relates generally to a process for removing liquids and water vapor from a fluid stream and particularly to a process for removing liquid hydrocarbons, water and water vapor from a natural gas stream containing an abundance of acidic gases such as hydrogen sulfide.

In recent years many natural gas wells have been completed which produce large amounts of hydrogen sulfide with the natural gas fluid streams. With improvements in processes for converting hydrogen sulfide gases into elemental sulfur, the production of gas wells containing hydrogen sulfide has become profitable. In addition to hydrogen sulfide and natural gas, these gas wells also produce certain amounts of condensable hydrocarbons. Further, in such production the gas stream will normally be saturated with water vapor. The pipelining of such gas streams to a central sulfur recovery plant and also the operation of these sulfur recovery plants dictate the early removal of the liquid components and the water vapor from the natural gas stream.

Prior to the present invention, this removal of liquids and water vapor has been accomplished by separation of the liquids and by contacting the gas stream with a liquid absorbent having an affinity for water. These procedures have been satisfactory in accomplishing the liquid separation and dehydration but have had the disadvantages of removing liquids which contain hydrogen sulfide and of saturating the liquid absorbent with hydrogen sulfide. Not only does this removal of a portion of the hydrogen sulfide from the gas stream limit the recovery of elemental sulfur, but it causes a corrosion problem in the storage of the hydrocarbon condensates and in the regeneration of the liquid absorbent. Further, in the regeneration of the liquid absorbent, an atmospheric pollution problem arises which will affect not only the immediate processing plant, but will under certain conditions be offensive and corrosive to surrounding areas.

Therefore, the primary object of the present invention is to provide an improved process and apparatus for dehydrating and separating liquids from a natural gas stream which contains large amounts of hydrogen sulfide. A further object of the present invention is to provide a novel process and apparatus for removing liquids and water vapor from a natural gas stream bearing substantial amounts of hydrogen sulfide whereby the hydrogen sulfide removed from the natural gas stream is reintroduced into the natural gas stream. Another object of the present invention is to provide a process for removing liquid and dehydrating a hydrogen sulfide bearing natural gas stream providing a hydrocarbon condensate substantially free of hydrogen sulfide contamination and to prevent the release of hydrogen sulfide gas to the atmosphere in the regeneration of the liquid absorbent. Still another object of the present invention is to provide a method for processing a natural gas stream containing an acidic gas whereby the amount of the acidic gas component in the natural gas stream is substantially unchanged in the processing of the natural gas stream.

In accomplishing these and other objects of the present invention, we have provided improved details of structure, the preferred form of which is illustrated in the accompanying drawing wherein the FIGURE is a schematic process flow diagram illustrating the novel features of the present invention.

Referring more in detail to the drawing:
Line 1 conducts the natural gas stream to be processed into the plant illustrated in the figure from a natural gas well head (not shown). The gas stream may be conducted through indirect heater 2, valve 3 and duct 4 into sorber 5 or through bypass valve 6 and duct 4 into sorber 5 if no heating of the gas stream is desired. It should be noted that the gas stream is introduced into sorber 5 below chimney tray 7 to allow condensed hydrocarbons and water to be removed in the lower portion of sorber 5. Heat exchange coil 8 within sorber 5 below chimney tray 7 will provide heat as hereinafter described to drive off a portion of the hydrogen sulfide gas in the separated liquids. Water is discharged from sorber 5 through water outlet 9 and hydrocarbon condensates are discharged therefrom through condensate outlet 10. The gas stream flows upwardly through contacting trays (not shown) in sorber 5 where it is intimately contacted by a liquid absorbent such as diethylene or triethylene glycol and is discharged from sorber 5 through gas outlet 11.

The liquid absorbent introduced into sorber 5 through inlet 12 flows downwardly therethrough intimately contacting the gas stream to absorb water vapor therefrom. The liquid absorbent collects on chimney tray 7 and is withdrawn from sorber 5 through outlet 13. The liquid absorbent withdrawn from sorber 5 has absorbed both water vapor and hydrogen sulfide. The liquid absorbent is pumped by pump 14 through heat exchanger 15 and duct 16 into liquid absorbent stripping vessel 17. The liquid absorbent flowing through heat exchanger 15 is heated by heat exchange with warm regenerated liquid absorbent as hereinafter more fully described. This heating of the liquid absorbent prior to its introduction into liquid absorbent stripping vessel 17 will not assist in the stripping of the absorbed hydrogen sulfide from the liquid absorbent.

To strip the liquid absorbent in stripping vessel 17, sweet gas (natural gas essentially free of the acid gas impurities) is introduced into the lower portion of stripping vessel 17 through duct 18. Stripping vessel 17 provides intimate contact between the liquid absorbent and the sweet gas stream. The gas stream containing the hydrogen sulfide stripped from the liquid absorbent is conducted through gas outlet 19 into sorber 5 at a point slightly above chimney tray 7.

The liquid absorbent being substantially free of absorbed hydrogen sulfide flows through outlet 20, pump 21, heat exchanger 22 into reconcentrator 23. The liquid absorbent flowing through pump 21 may be used to provide pumping power for pump 21 or to provide balancing of pump 21 with external gas pressure being utilized for pumping. The liquid absorbent is heated in heat exchanger 22 by heat exchange with warm reconcentrated liquid absorbent. The warm reconcentrated liquid absorbent flows from reconcentrator 23 through heat exchangers 15 and 22 previously described and is pumped by pump 21 through inlet 12 into the upper portion of sorber 5. Valves 24 and 25 are provided to allow reconcentrated liquid absorbent from pump 21 to flow through heat exchange coil 8 in accordance with the heating needs in the lower portion of sorber 5 and the cooling needs of the reconcentrated liquid absorbent.

Sweet gas is introduced into the plant illustrated in the figure through line 26 into a heating coil within indirect heater 2, valve 27 into line 28. Bypass valve 29 is provided if the sweet gas does not need to be heated. A portion of the sweet gas flows through line 30, a heating coil within reconcentrator 23, line 31 and into liquid absorbent stripping vessel 17 through duct 18. A portion of the sweet gas flowing through line 31 is conducted through inlet 32 into hydrocarbon condensate stripping vessel 33. Sweet gas also may be conducted into stripping vessel 33 through valve 34 and inlet 35. The remaining portion of the sweet gas flowing through line 28 is conducted through line 36, valve 37 and inlet 35 into stripping vessel 33 if valve 37 is open.

Hydrocarbon condensates discharged from sorber 5 through condensate outlet 10 are pumped by pump 38 through inlet 39 into the upper portion of stripping vessel 33. Stripping vessel 33 provides intimate contact between the hydrocarbon condensate flowing downwardly therethrough and the sweet gas flowing upwardly therethrough. This contact of the hydrocarbon condensates containing absorbed hydrogen sulfide and the sweet gas will remove substantially all of the absorbed hydrogen sulfide from the hydrocarbon condensates allowing the hydrocarbon condensates to be discharged from stripping vessel 33 through outlet 40 to suitable storage facilities (not shown). The gas is discharged from stripping vessel 33 through gas outlet 41 and is conducted into sorber 5 at the position slightly below chimney tray 7.

Care should be taken to assure only adequate heating of the sweet gas. If desired, a hydrocarbon condensate heater may be installed between pump 38 and stripping vessel 33 in line 39 to assist the sweet gas in its stripping operation.

From the foregoing it may be seen that we have provided a process and apparatus for removing liquids and water vapor from a fluid stream while maintaining the acid gas content of such fluid stream. Further, we have provided a method of processing a sour gas stream in which the problems of atmospheric pollution and acid gas contamination of the recovered condensates and absorbent liquids are eliminated.

What we claim and desire to secure by Letters Patent is:

1. The method of dehydrating a fluid stream containing hydrogen sulfide and having a liquid component and a gas component comprising,
   initially separating the liquid component from the gas component of said fluid stream,
   contacting the gas component of said fluid stream with a liquid dehydrating agent subsequent to said initial separation,
   separating the liquid dehydrating agent from said gas component after contact therewith,
   gas stripping hydrogen sulfide from the separated liquid dehydrating agent with a sweet gas,
   combining the stripping gas from said gas stripping of said dehydrating agent with the gas component of said fluid stream subsequent to said initial separation and prior to said contacting of said gas component with said liquid dehydrating agent,
   reconcentrating the hydrogen sulfide free liquid dehydrating agent,
   recirculating the reconcentrated liquid dehydrating agent into contact with said gas component of said fluid stream,
   gas stripping hydrogen sulfide from said separated liquid component with a sweet gas, and
   combining the stripping gas from said gas stripping of said separated liquid component with said gas component subsequent to said initial separation and prior to said contacting of said gas component with said liquid dehydrating agent.

2. An apparatus for dehydrating a fluid stream containing hydrogen sulfide comprising,
   a sorber,
   a first stripping tower and
   a second stripping tower,
   means introducing the fluid stream to be dehydrated into the lower portion of said sorber,
   means in the lower portion of said sorber separating the liquid portion of said fluid stream from the gas portion of said fluid stream and conducting said gas portion of said fluid stream upwardly through said sorber,
   means introducing a dehydrating agent into the upper portion of said sorber,
   said sorber providing initiate contact between said gas portion of said fluid stream and said dehydrating agent therein,
   means conducting dehydrating agent from the lower portion of said sorber into the upper portion of said first stripping tower,
   a source of sweet gas,
   means conducting said sweet gas into the lower portion of said first stripping tower,
   means within said first stripping tower to provide initmate contact between said dehydrating agent and said sweet gas,
   means conducting gas ladened with hydrogen sulfide from the upper portion of said first stripping tower into the lower portion of said sorber,
   a dehydrating agent reconcentrator,
   means conducting said dehydrating agent free of hydrogen sulfide from the lower portion of said first stripping tower to said reconcentrator,
   means conducting reconcentrated dehydrating agent from said reconcentrator to said means introducing said dehydrating agent into the upper portion of said sorber,
   means conducting the separated liquid portion of said fluid stream from the lower portion of said sorber into the upper portion of said second stripping tower,
   means conducting sweet gas from said source of sweet gas into the lower portion of said second stripping tower,
   means discharging said liquid portion free of hydrogen sulfide from said second stripping tower,
   means conducting gas ladened with hydrogen sulfide from the upper portion of said second stripping tower into the lower portion of said sorber, and
   means discharging dehydrated gas from the upper portion of said sorber.

3. An apparatus for dehydrating a fluid stream having a liquid component and a gas component and containing hydrogen sulfide comprising,
   an absorption chamber having means for providing intimate contact between a liquid stream and a gas stream,
   a first stripping chamber,
   a second stripping chamber,
   said first and second stripping chambers having means for providing intimate contact between a liquid stream and a gas stream,
   a separation chamber,
   means introducing the fluid stream to be dehydrated into said separation chamber,
   means conducting the gas portion of said fluid stream from said separation chamber into said absorption chamber,
   means introducing a dehydrating agent into said absorption chamber for intimate contact with said gas portion of said fluid stream,
   means conducting dehydrating agent after contact with said gas portion of said fluid stream from said absorption chamber into said first stripping chamber,
   a source of sweet gas,
   means conducting sweet gas from said sweet gas source into said first stripping chamber for intimate contact with said dehydrating agent,
   means conducting gas ladened with hydrogen sulfide after contact with said dehydrating agent in said first stripping chamber into said absorption chamber,
   a dehydrating agent reconcentrator,
   means conducting said dehydrating agent free of hydrogen sulfide from said first stripping chamber after intimate contact with said sweet gas to said reconcentrator, means conducting reconcentrated dehydrating agent from said reconcentrator to said means introducing said dehydrating agent into said absorption chamber, means conducting the separated liquid portion of said fluid stream from said separation chamber to said second stripping chamber, means conducting sweet gas from said sweet gas source into said second stripping chamber for intimate contact with said separated liquid portion of said fluid stream, means discharging said separated liquid portion free of hydrogen sulfide from said second stripping chamber, means conducting gas ladened with hydrogen sulfide after contact with said separated liquid portion in said second stripping chamber to said absorption chamber, and means discharging dehydrated gas from said absorption chamber.

References Cited in the file of this patent

UNITED STATES PATENTS

| | | |
|---|---|---|
| 2,574,644 | Landau | Nov. 13, 1951 |
| 2,996,142 | Worley | Aug. 15, 1961 |

FOREIGN PATENTS

| | | |
|---|---|---|
| 286,622 | Great Britain | June 5, 1929 |
| 611,224 | Great Britain | Oct. 27, 1948 |
| 728,444 | Great Britain | Apr. 20, 1955 |